United States Patent Office 2,863,984
Patented Dec. 9, 1958

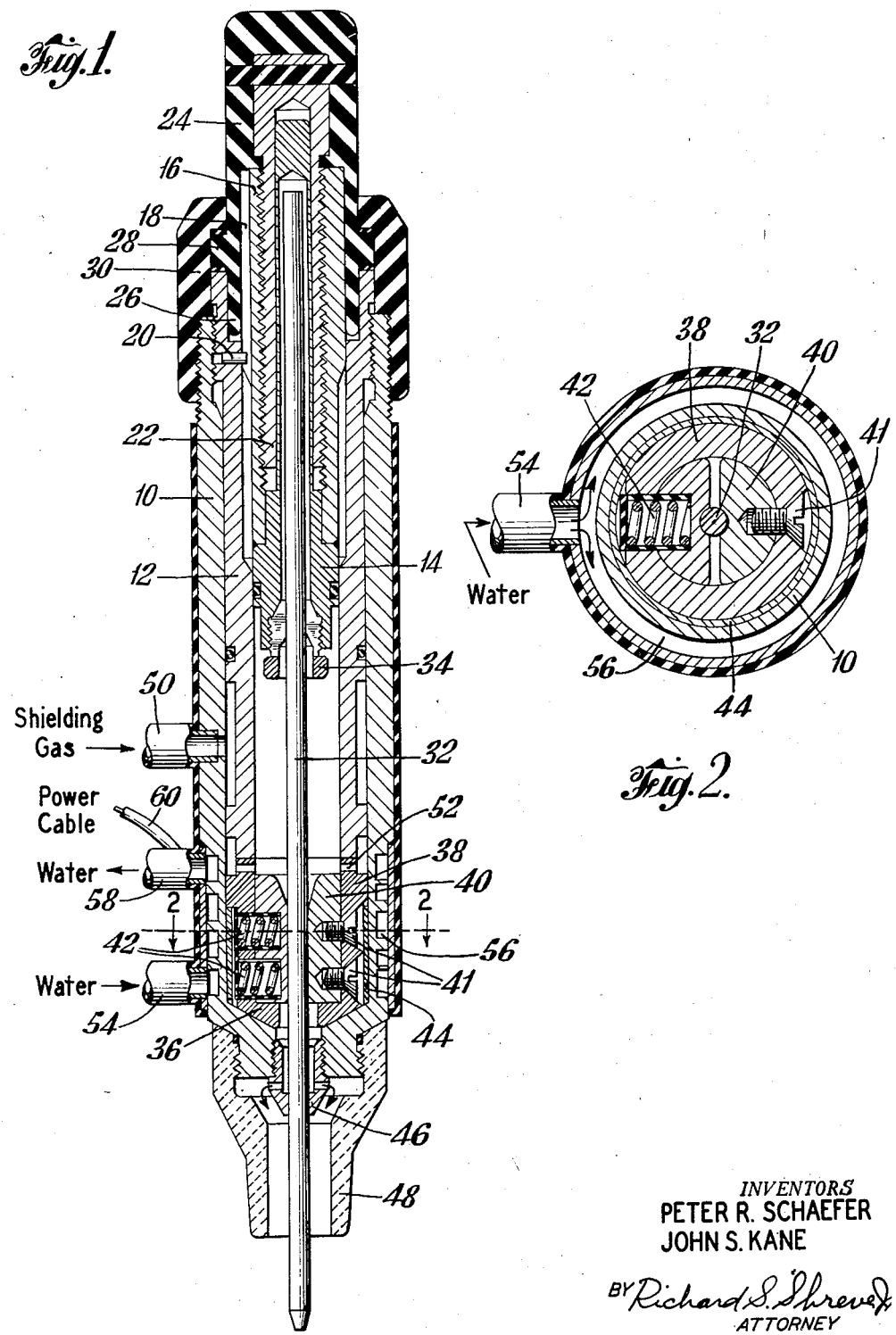

2,863,984

GAS SHIELDED ARC TORCHES

Peter R. Schaefer, Newark, and John S. Kane, Watchung, N. J., assignors to Union Carbide Corporation, a corporation of New York Application May 31, 1957, Serial No. 662,747

5 Claims. (Cl. 219—75)

This invention relates to gas shielded arc torches of the mechanized or machine type for propelling a non-consumable electrode along a line of weld.

For long lines of weld, such as are encountered in welding extruded cooling fins to heat exchanger tubes, it is desirable to maintain a critical arc length from the electrode to the workpiece, notwithstanding tolerance variations of the extruded fins and the tube. In torches heretofore provided, the electrode has been gripped by a collet which supplies the welding current thereto. This arrangement prevents adjustment of the electrode position with respect to the torch during the welding operation.

In the immediately contemplated use of the subject torches for mechanized welding of heat exchanger tubes, the workpiece is held stationary and the torches propelled along the welds. However, it is equally applicable to the reverse set-up in which the workpiece is propelled past stationary torches. In addition, using standard electric welding torches, it is possible to adjust the electrode-to-workpiece-distance by moving the entire torch either toward or away from the work without moving the electrode relative to the torch.

Therefore, the main object of the present invention is to enable the nonconsumable electrode to be adjusted, during the welding cycle, toward and away from the workpiece while the torch is maintained at a substantially constant distance from the workpiece regardless of which is in motion, the workpiece or the torch.

According to the present invention the gas shielded arc torch comprises an electrode holder slidable in the upper portion of a torch barrel, means for raising and lowering said holder in said barrel, a gas directing nozzle below said barrel, and a sliding contact for supplying welding current to an electrode carried by said holder while it is being raised or lowered by said means.

In the drawings:

Figure 1 is a vertical axial section through a torch according to the preferred embodiment of the present invention; and Figure 2 is a horizontal section taken along the line 2—2 of Fig. 1.

The torch shown in the drawing comprises a body 10 forming a sheath containing a barrel 12 in which is slidable an electrode holder 14. The holder 14 comprises an internally threaded outer sleeve 16 having a keyway 18 receiving a guide pin 20 in the barrel 12 to prevent rotation of the sleeve 16 therein.

Threaded in the sleeve 16 is an externally threaded adjusting screw 22, to the outer end of which is pinned an adjusting knob 24. The knob 24 has a skirt 26 which extends down over the outer sleeve 16 inside the barrel 12 and has an annular shoulder 28 abutting the top of the barrel. Cap 30 is threaded onto body 10 and shoulders on the top thereof, allowing sufficient clearance between annular shoulder 28 and the top of barrel 12 to permit rotary motion of knob 24, but prohibiting axial movement thereof. A non-consumable electrode 32 is secured in the bore of the electrode holder 14 by a retaining collet 34.

A jaw holder 36 is mounted in the body 10 below the barrel 12, and comprises a sleeve 38 containing substantially semi-cylindrical jaws 40. Barrel 12 is threaded into body 10 and loads jaw holder 36 against the conical seat in body 10. One of the jaws 40 is held in place by screws 41 and the other urged toward it by coil compression springs 42 mounted in radial bores in the sleeve 38 to ensure positive electrical contact between the electrode and the jaws. The sleeve 38, springs 42 and screws 41 are enclosed by a spring retainer ring 44 which maintains the loading of the springs. The body 10 has a baffle cap 46 screwed into the bore thereof, and a gas directing nozzle 48 is screwed onto the outside of the body 10. Shielding gas such as argon enters an inlet 50 in the sheath to an annular chamber outside the barrel, through holes 52 to the inside of the barrel, passes between the jaws 40 and through the baffle cap 46 to the interior of the nozzle 48 and on out therethrough to shield the arc. Cooling water enters an inlet 54 and passes around a spiral groove 56 to an outlet 58.

Welding current is supplied to the jaw holder 36 by a cable 60, and passes to the electrode 32 through contact jaws 40 to maintain an arc between the electrode and a workpiece, shielded by the gas from the nozzle 48.

During the welding operation when an intolerable variation in the workpiece occurs, the electrode may be raised or lowered by turning the knob 24, which turns the screw 22. The collar 28 being held against axial movement, and the keyway 18 being held against rotation, the screw 22 slides the sleeve 16 along the barrel 12, raising or lowering the holder 14 and the electrode 32 carried thereby.

During the raising or lowering the electrode 32 slides between the contact jaws 40, which receive the welding current, so that the current is not interrupted by the adjusting movement.

What is claimed is:

1. In a gas shielded arc welding torch, a barrel, an electrode holder axially slidably keyed in said barrel, a collet screwed into the bottom of said holder for gripping an electrode depending therefrom, a screw threaded in the top of said holder for raising and lowering said collet gripped electrode, a gas directing nozzle below said barrel, and spring pressed coacting jaws in the bottom of said barrel slidably engaging the depending electrode gripped by said collet for supplying welding current to said electrode while it is being raised or lowered by said screw.

2. In a gas shielded arc welding torch, a barrel, an electrode holder axially slidably keyed in said barrel, a collet screwed into the bottom of said holder for gripping an electrode depending therefrom, a screw threaded in the top of said holder turnable by a knob above the top of said barrel for raising and lowering said collet gripped electrode, a gas directing nozzle below said barrel, and spring pressed coacting jaws in the bottom of said barrel slidably engaging the sides of depending electrode gripped by said collet for supplying welding current to said electrode while it is being raised or lowered by said screw.

3. In a gas shielded arc welding torch, a barrel, an electrode holder axially slidably keyed in said barrel, a collet screwed into the bottom of said holder for gripping an electrode depending therefrom, a screw threaded in the top of said holder for raising and lowering said collet gripped electrode, a gas directing nozzle below said barrel, a jaw container between said holder and nozzle, and spring pressed coacting jaws in said container slidably engaging the depending electrode gripped by said collet for supplying welding current to said electrode while it is being raised or lowered by said screw.

4. In a gas shielded arc welding torch, a barrel, an electrode holder axially slidably keyed in said barrel, a collet screwed into the bottom of said holder for gripping an electrode depending therefrom, a screw threaded in the top of said holder for raising and lowering said collet gripped electrode, a gas directing nozzle below said barrel, a jaw container between said holder and nozzle, a semi-cylindrical jaw secured in said container, a coacting semi-cylindrical jaw, coil compression spring means for urging said coacting jaw toward said secured jaw into sliding engagement of said jaws with the depending electrode therebetween from said collet for supplying welding current to said electrode while it is being raised or lowered by said screw.

5. In a gas shielded arc welding torch, a barrel, an electrode holder in said barrel having an internally threaded sleeve keyed to said barrel to prevent rotation thereof, an externally threaded screw inside said sleeve having an annular shoulder to prevent axial movement theerof, a collet screwed into the bottom of said holder for gripping an electrode depending therefrom, a knob above said barrel for turning said screw for raising and lowering said collet gripped electrode, a gas directing nozzle below said barrel, and spring pressed coacting jaws in the bottom of said barrel slidably engaging the depending electrode gripped by said collet for supplying welding current to said electrode while it is being raised or lowered by said screw.

References Cited in the file of this patent

UNITED STATES PATENTS

| | | |
|---|---|---|
| 2,468,807 | Herbst | May 3, 1949 |
| 2,636,967 | Bassot et al. | Apr. 28, 1953 |
| 2,769,894 | Rives | Nov. 6, 1956 |

FOREIGN PATENTS

| | | |
|---|---|---|
| 791,871 | France | Oct. 7, 1935 |